United States Patent [19]

Schroeder

[11] Patent Number: 4,526,425
[45] Date of Patent: Jul. 2, 1985

[54] DUAL WHEEL MOUNTING ARRANGEMENT

[75] Inventor: Philip W. Schroeder, Derby, Kans.

[73] Assignee: J. I. Case Company, Racine, Wis.

[21] Appl. No.: 481,767

[22] Filed: Apr. 4, 1983

[51] Int. Cl.³ .............................................. B60B 11/00
[52] U.S. Cl. .................................. 301/36 R; 301/40 S
[58] Field of Search ............ 301/13 R, 36 R, 36 WP, 301/40 S; 152/376

[56] References Cited

U.S. PATENT DOCUMENTS

| 2,609,247 | 9/1952 | Carter | 301/36 R |
| 3,840,273 | 10/1974 | Johns | 301/36 R |
| 4,448,455 | 5/1984 | Ellegaard | 301/36 R |

FOREIGN PATENT DOCUMENTS 1296030 9/1969 Fed. Rep. of Germany .... 301/36 R

Primary Examiner—David A. Scherbel
Attorney, Agent, or Firm—Dressler, Goldsmith, Shore, Sutker & Milnamow, Ltd.

[57] ABSTRACT

A dual wheel mounting arrangement for material handling implements is disclosed which permits the second, outer wheel of the arrangement to be easily and quickly releasably affixed to the first, inner wheel of the arrangement. The connecting arrangement includes a plurality of spokes affixed to a rim portion of the second wheel assembly, and further includes a generally elongated removable wheel fastener which is adapted to coact with the spokes for securing the second wheel assembly to the first. An adapter bracket is adapted to be mounted in association with the first wheel assembly by its lug fasteners, with the adapter bracket being adapted to releasably receive the wheel fastener. In one embodiment of the invention, a plurality of openings are defined by the hub portion of the first wheel assembly, with the openings respectively receiving projecting portions of the spokes affixed to the rim of the second wheel assembly, thus operatively interconnecting the wheel assemblies in driving relation. In another embodiment, a modified adapter bracket is provided for mounting in association with the first wheel assembly, with the adapter bracket defining at least one opening which is adapted to receive a projecting poriton of one of the spokes affixed to the rim of the second wheel assembly.

8 Claims, 5 Drawing Figures

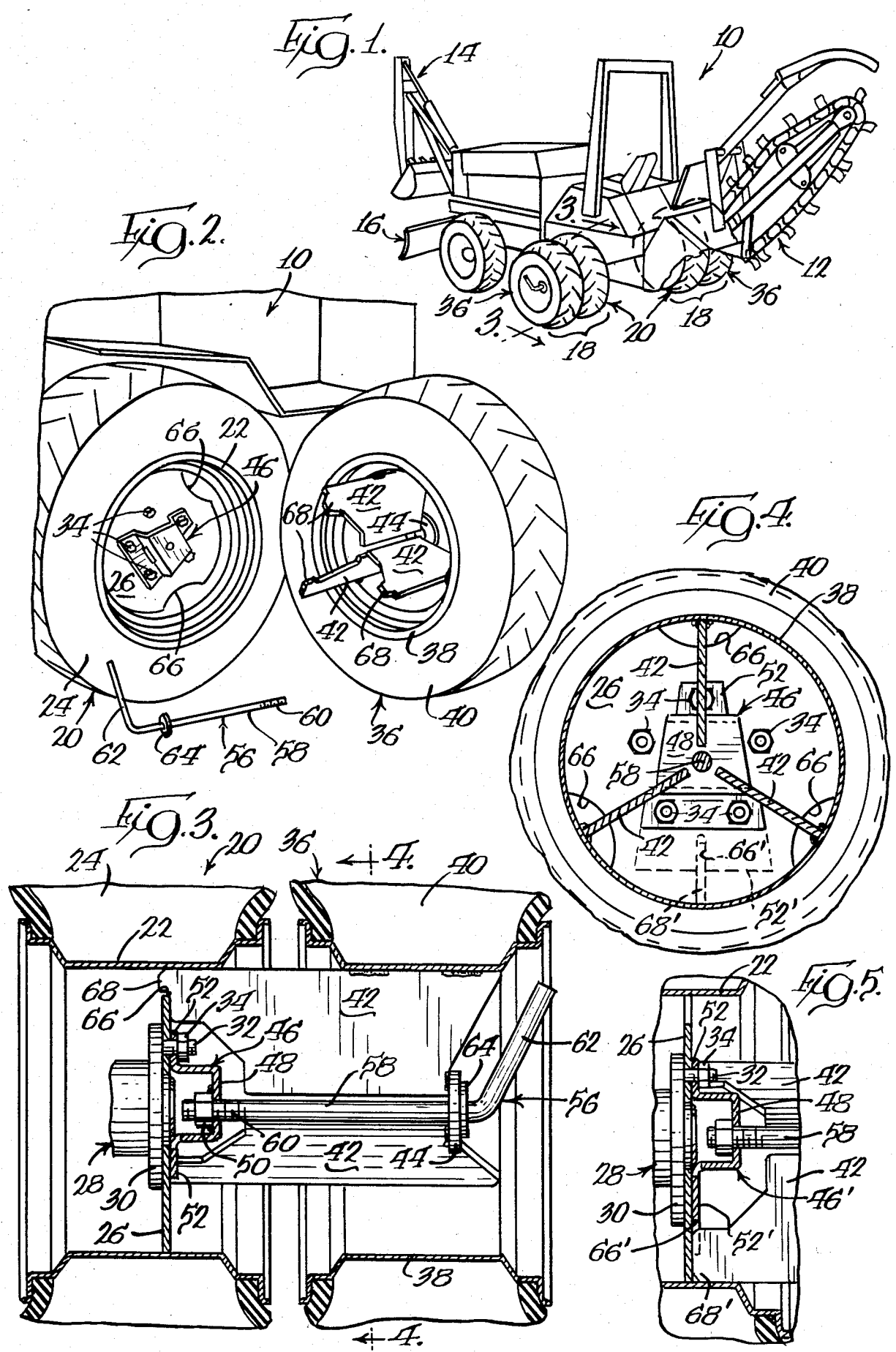

DUAL WHEEL MOUNTING ARRANGEMENT

TECHNICAL FIELD

The present invention relates generally to wheel assemblies for mobile equipment, and more particularly to a dual wheel mounting arrangement having a detachable outer wheel assembly which is particularly suited for use with a material handling implement.

BACKGROUND OF THE INVENTION

Part of the versatility of material handling implements comes from their ability to perform material handling operations in a wide variety of working environments. Thus, a material handling implement must be capable of properly functioning in soft or muddy soil, and other areas which offer relatively little traction and support for the machine. At the same time, it is desirable that material handling implements be highly maneuverable to permit them to operate efficiently where working space is limited.

One manner in which a material handling implement may be adapted for operation where traction and support for the machine are relatively low is by attachment of dual wheel assemblies to the implement. Such dual wheel assemblies, which are frequently fitted with low pressure, high flotation tires, greatly enhance the available traction for operating the implement, and afford greatly improved lateral stability for the implement. Good traction and stability act to enhance the efficiency with which material handling operations can be performed.

As will be recognized, use of dual wheel assemblies on an implement can substantially increase the overall width of the machine. Consequently, the maneuverability of the implement can be impaired, particularly where the working environment is cramped, or where access to the work site is narrow or restricted. In order to lessen the overall width of an implement having dual wheel assemblies, it is ordinarily necessary to disassemble the dual wheel assemblies, which of course can be inconvenient and time-consuming.

Because of the highly competitive nature of material handing work, operations must be performed efficiently. Therefore, it is desirable to provide a dual wheel mounting arrangement for a material handling implement to provide the implement with enhanced traction and stability, and which permits the outer wheel of the dual wheel assembly to be easily and quickly detached to reduce the width of the machine for movement where space is limited.

SUMMARY OF THE INVENTION

In accordance with the present invention, a dual wheel mounting arrangement is disclosed which permits the outer wheel assembly of the arrangement to be easily and quickly affixed to and detached from the inner wheel of the arrangement. In this way, a material handling implement to which the dual wheel arrangement is mounted is provided with enhanced traction and stability, with the detachable nature of the outer wheel assembly permitting the overall width of the implement to be substantially reduced for movement in restricted areas.

The present dual wheel arrangement includes a first wheel assembly having a first rim portion, and a hub portion adapted to be mounted on and driven by an associated axle with lug fasteners. The invention further includes a second wheel assembly having a second rim portion which is preferably generally the same size as the rim portion of the first wheel assembly.

In order to permit the first and second wheel assemblies to be detachably joined generally adjacent each other so that the first wheel assembly drives the second, the present invention includes a detachable connecting arrangement. The connecting arrangement includes a plurality of radially oriented spokes affixed to the rim portion of the second wheel assembly, with the spokes extending substantially beyond one side of the second wheel assembly.

The spokes are adapted to engage and coact with the first wheel assembly for driving the second wheel assembly, and to this end the connecting arrangement includes a generally elongated releasable wheel fastener which is adapted to extend through the second wheel assembly centrally of its rim portion, and which is adapted to engage and bear against a spoke collar affixed to the radially oriented spokes.

The connecting arrangement further includes an adapter bracket which is adapted to be fitted in association with the hub portion of the first wheel assembly, and which is adapted to releasably and preferably threadably receive the releasable wheel fastener of the connecting arrangement. In the illustrated embodiment, the adapter bracket is adapted to be fixedly mounted in association with the hub portion of the first wheel assembly by the lug fasteners which secure the first wheel assembly to its associated axle. This preferred construction of the present invention facilitates its adaptability to existing wheel arrangements, and also permits the first wheel assembly to be used alone in a normal fashion.

In order to assure that the second wheel assembly is firmly held in position with respect to the first wheel assembly, the spokes affixed to the second rim portion preferably extend within and bear against the rim portion of the first wheel assembly. By this construction, both wheel assemblies of the arrangement act to support the load of the implement to which they are affixed, thus providing the desired traction and lateral stability of a dual wheel construction.

Since it is desirable for both wheel assemblies of the arrangement to propel the implement, the present invention includes an arrangement for operatively interconnecting the first wheel assembly with the second wheel assembly so that the first wheel assembly is adapted to drive the second. In one embodiment of the invention, this is achieved by the provision of a plurality of openings in the hub portion of the first wheel assembly, with each of the openings being adapted to respectively receive a projecting portion of each of the spokes affixed to the rim portion of the second wheel assembly. In an alternate embodiment, the adapter bracket which is mounted in association with the hub portion of the first wheel assembly defines an opening which is adapted to receive a projecting portion of one of the spokes affixed to the rim portion of the second wheel assembly. By these constructions, the driving force imparted to the first wheel assembly by the axle on which it is mounted is further imparted from the first wheel assembly to the second.

By the configuration of the present invention, the second, outer wheel assembly of the dual wheel arrangement can be easily and quickly mounted on or detached from the first wheel assembly of the arrangement with the use of the releasable wheel fastener. As will be recognized, the construction is very straightforward for ease of fabrication and use, and is rugged for reliability under the severe operating conditions to which material handling implements are typically subjected.

Numerous other features and advantages of the present invention will become readily apparent from the following detailed description and the accompanying drawings.

BRIEF DESCRIPTION OF THE DRAWINGS

FIG. 1 is a perspective view of a material handling implement having dual wheel mounting arrangements in accordance with the present invention;

FIG. 2 is an enlarged perspective view of one of the dual wheel assemblies on the implement illustrated in FIG. 1, with the outer wheel of the assembly detached from the inner wheel;

FIG. 3 is a cross-sectional view taken generally along lines 3—3 of FIG. 1;

FIG. 4 is a cross-sectional view taken generally along lines 4—4 of FIG. 3; and

FIG. 5 is a partial cross-sectional view similar to FIG. 3 illustrating an alternate embodiment of the present invention.

DETAILED DESCRIPTION

While the present invention is susceptible of embodiment in various forms, there is shown in the drawings and will hereinafter be described first and second alternate embodiments of the invention, with the understanding that the present disclosure is to be considered as an exemplification of the principles of the invention, and is not intended to limit the invention to the specific embodiments illustrated.

FIG. 1 illustrates a multi-purpose material handling implement 10 for use with which the present dual wheel mounting arrangement is particularly adapted, with implement 10 including a trencher 12, a backhoe 14, and a dozer blade 16. While the present invention can be used with many different types of material handling implements, the present invention is disclosed in association with material handling implement 10 since this type of implement is adapted to perform many different types of work operations, and must be capable of operating efficiently in different types of working environments.

Accordingly, the implement 10 includes dual wheel assemblies 18 embodying the present invention, which provide the implement with relatively high traction and stability as is frequently required, but which permit the overall width of the machine to be substantially reduced by removal of the outer wheels of the dual wheel assemblies 18.

Referring now to FIGS. 2-4, one of the dual wheel assemblies 18 illustrated in FIG. 1 will be described in detail, with the understanding that each of wheel assemblies 18 is preferably similarly configured.

The dual wheel assembly 18 includes a first, inner wheel assembly 20 having a circular first rim portion 22 to which is fitted a first tire 24. Wheel assembly 20 includes a hub portion 26 which is firmly affixed to rim portion 22, and which is adapted to be mounted on an associated axle 28 of implement 10 (see FIG. 3). In this regard, axle 28 includes an axle flange 30 to which hub portion 26 is fixedly mounted by means of threaded lug fastener shanks 32 which project from axle flange 30, and by lug fastener nuts 34 respectively threadably affixed to shanks 32. By this construction, axle 28 is adapted to positively drive first wheel assembly 20.

Dual wheel assembly 18 further includes a second wheel assembly 36 including a second rim portion 38 to which is fitted a second tire 40, with rim portion 38 and tire 40 preferably being similar in size to first rim portion 22 and first tire 24, respectively.

In order to operatively and detachably connect second wheel assembly 36 with first wheel assembly 20, the arrangement includes a plurality of radially oriented spokes 42 (three being illustrated) affixed to and extending inwardly of rim portion 38 of second wheel assembly 36. As best illustrated in FIG. 3, each of spokes 42 extends substantially beyond one side of rim portion 38, with the spokes 42 being adapted to engage and bear against rim portion 22 of first wheel assembly 20. By this configuration, second wheel assembly 36 is maintained in aligned relation with first wheel assembly 20, so that both of the wheel assemblies act to support axle 28 of implement 10. A spoke collar 44 is preferably positioned centrally of second rim portion 38, and is affixed to each of spokes 42, such as by welding.

The present mounting arrangement further includes an adapter bracket 46 which is adapted to be mounted in association with hub portion 26 of first wheel assembly 20. Adapter bracket 46 preferably includes a threaded portion, and to this end includes an upstanding portion 48 to which is affixed a threaded adapter nut 50. The adapter bracket further includes opposed flange portions 52 which permit the adapter bracket to be mounted in close association with hub portion 26 by means of shanks 32 and lug nuts 34. Thus, it will be recognized that adapter bracket 46 can be very easily mounted on first wheel assembly 20 without any modification of the wheel.

In order to detachably connect second wheel assembly 36 with first wheel assembly 20, the present invention includes a generally elongated, releasable wheel fastener 56. Wheel fastener 56 includes a shank portion 58 having threads 60, with the shank portion being adapted to be releasably, threadably received by adapter bracket 46. The wheel fastener 56 preferably includes a handle portion 62 joined with shank portion 58. As best shown in FIG. 3, handle portion 62 is preferably disposed at an obtuse angle with respect to shank portion 58, and is preferably dimensioned so as not to extend substantially beyond the outer side of second rim portion 38. By this configuration, the wheel fastener 56 can be very securely and firmly threaded into adapter bracket 46. The use of a hammer or wrench, or a length of pipe fitted to handle portion 42, assures that the fastener is securely tightened.

The present invention contemplates that first wheel assembly 20 and second wheel assembly 36 are adapted to be driven together by axle 28, and to this end the arrangement includes means for operatively interconnecting, in driving relation, the first and second wheel assemblies. In this embodiment, the hub portion 26 of first wheel assembly 20 preferably defines at least one opening adapted to receive a portion of one of spokes 42 affixed to second rim portion 38. Accordingly, hub portion 26 defines a plurality of openings 66 which preferably correspond in number to the number of spokes 42. Each of openings 66 is adapted to respectively receive a projecting portion 68 of each of spokes 42 so that the spokes 42 firmly engage the hub portion 26. In this manner, first wheel assembly 20 drives second wheel assembly 36. This is an important feature of the present invention since it permits the two wheel assemblies to be driven in tandem without direct connection of second wheel assembly 36 to the driving axle 28.

An alternate arrangement for operatively interconnecting wheel assemblies 20 and 36 in driving relation with each other is illustrated in phantom line in FIG. 4, and in FIG. 5. In this alternate embodiment, the configuration of the connecting arrangement is essentially similar in most respects to the previously described embodiment. However, in this embodiment spokes 42 affixed to second rim portion 38 need not include portions projecting into openings defined by the hub portion 26 of first wheel assembly 20. Instead, a modified adapter bracket 46' is provided with the bracket 46' including a flange portion 52' which not only permits the adapter bracket to be affixed in association with hub portion 26 by lug fasteners 32 and 34, but which also defines an opening 66' within which a projecting portion 68' of at least one of spokes 42 is adapted to be positioned. By this construction, first wheel assembly 20 is adapted to positively drive second wheel assembly 36. It will be recognized that for some applications this alternate construction will be preferred since no modifications of an existing first wheel assembly are necessary. Rather, the modified adapter bracket 46' can be affixed in association with the first wheel assembly by its lug fasteners, with the second wheel assembly 36 having spokes 42 affixed thereto appropriately positioned with respect to the first wheel assembly, and securely affixed thereto with wheel fastener 56.

From the foregoing, it will be observed that numerous variations and modifications may be effected without departing from the true spirit and scope of the concept of the present invention. It will be understood that no limitation with respect to the specific embodiments illustrated herein is intended or should be inferred. It is, of course, intended to cover by the appended claims all such modifications as fall within the scope of the claims.

What is claimed is:

1. A dual wheel mounting arrangement, comprising:
   a first wheel assembly having a first rim portion, and a hub portion adapted to be mounted on and driven by an associated axle;
   a second wheel assembly having a second rim portion; and
   means for detachably connecting said second wheel assembly to said first wheel assembly so that said first wheel assembly is adapted to drive said second wheel assembly,
   said connecting means including spoke means affixed to said second rim portion of said second wheel assembly, said spoke means being adapted to engage and coact with said first wheel assembly for driving said second wheel assembly,
   said connecting means further including releasable wheel fastener means adapted to engage said spoke means for detachably connecting said second wheel assembly to said first wheel assembly, and adapter means adapted to be fixedy mounted in association with said first wheel assembly, said adapter means being adapted to releasably receive said wheel fastener means for releasably connecting said spoke means with said first wheel assembly,
   said hub portion of said first wheel assembly defining at least one opening adapted to receive a portion of said spoke means.

2. The dual wheel mounting arrangement in accordance with claim 1, wherein
   said adapter defines at least one opening adapted to receive a portion of said spoke means.

3. A dual wheel mounting arrangement, comprising:
   a first wheel assembly having a first rim portion, and a hub portion adapted to be mounted on an associated axle with lug fastener means, said axle being adapted to drive said first wheel assembly;
   a second wheel assembly having a second rim portion; and
   means for detachably connecting said second wheel assembly to said first wheel assembly so that said first wheel assembly is adapted to drive said second wheel assembly,
   said connecting means comprising spoke means including a plurality of radially oriented spokes affixed to said second rim portion of said second wheel assembly, said spokes being adapted to bear against said first rim portion,
   said connecting means further comprising releasable wheel fastener means adapted to engage said spoke means for releasably connecting said spoke means to said first wheel assembly, and an adapter bracket adapted to be mounted in association with said first wheel assembly by said lug fastener means, said adapter bracket being adapted to releasably threadably receive said releasable wheel fastener means for releasably connecting said spoke means to said first wheel assembly,
   said first hub portion of said first wheel assembly defining a plurality of openings, said spokes of said spoke means each including a portion adapted to be respectively received within said openings.

4. The dual wheel mounting arrangement in accordance with claim 3, wherein
   said spoke means includes a spoke collar affixed to said spokes centrally of said second rim portion, said releasable fastener means being adapted to engage and bear against said spoke collar for releasably connecting said spoke means to said first wheel assembly.

5. A dual wheel mounting arrangement for an implement having a first wheel assembly including a first rim portion, and a hub portion affixed to said implement with lug fastener means, comprising:
   a second wheel assembly having a second rim portion;
   spoke means including a plurality of radially oriented spokes affixed to said second rim portion and extending beyond one side thereof;
   an adapter bracket adapted to be mounted in association with said first wheel assembly by said lug fastener means; and
   a releasable wheel fastener adapted to releasably engage and coact with said spoke means and said adapter bracket for detachably connecting said spoke means with said first wheel assembly so that said spokes bear against said first rim portion.

6. The dual wheel mounting arrangement in accordance with claim 5, wherein
   said hub portion defines a plurality of openings adapted to respectively receive a portion of each of said spokes.

7. The dual wheel mounting arrangement in accordance with claim 5, wherein
   said adapter bracket defines an opening adapted to receive a portion of at least one of said spokes.

8. A dual wheel mounting arrangement, comprising:
a first wheel assembly having a first rim portion, and a hub portion adapted to be mounted on an associated axle with lug fastener means, said axle being adapted to drive said first wheel assembly;

a second wheel assembly having a second rim portion; and means for detachably connecting said second wheel assembly to said first wheel assembly so that said first wheel assembly is adapted to drive said second wheel assembly, said connecting means comprising spoke means including a plurality of radially oriented spokes affixed to said second rim portion of said second wheel assembly, said spokes being adapted to bear against said first rim portion, said connecting means further comprising releasable wheel fastener means adapted to engage said spoke means for releasably connecting said spoke means to said first wheel assembly, and an adapter bracket adapted to be mounted in association with said first wheel assembly by said lug fastener means, said adapter bracket being adapted to releasably threadably receive said releasable wheel fastener means for releasably connecting said spoke means to said first wheel assembly, said adapter defining an opening adapted to receive a portion of at least one of said spokes.

* * * * *